INVENTORS
GEORGE STEINER,
JOSEPH H. DEMAIRE,
BY

Aug. 18, 1964    G. STEINER ETAL    3,144,785
ADJUSTABLE STEERING COLUMN
Filed Sept. 21, 1962    2 Sheets-Sheet 2
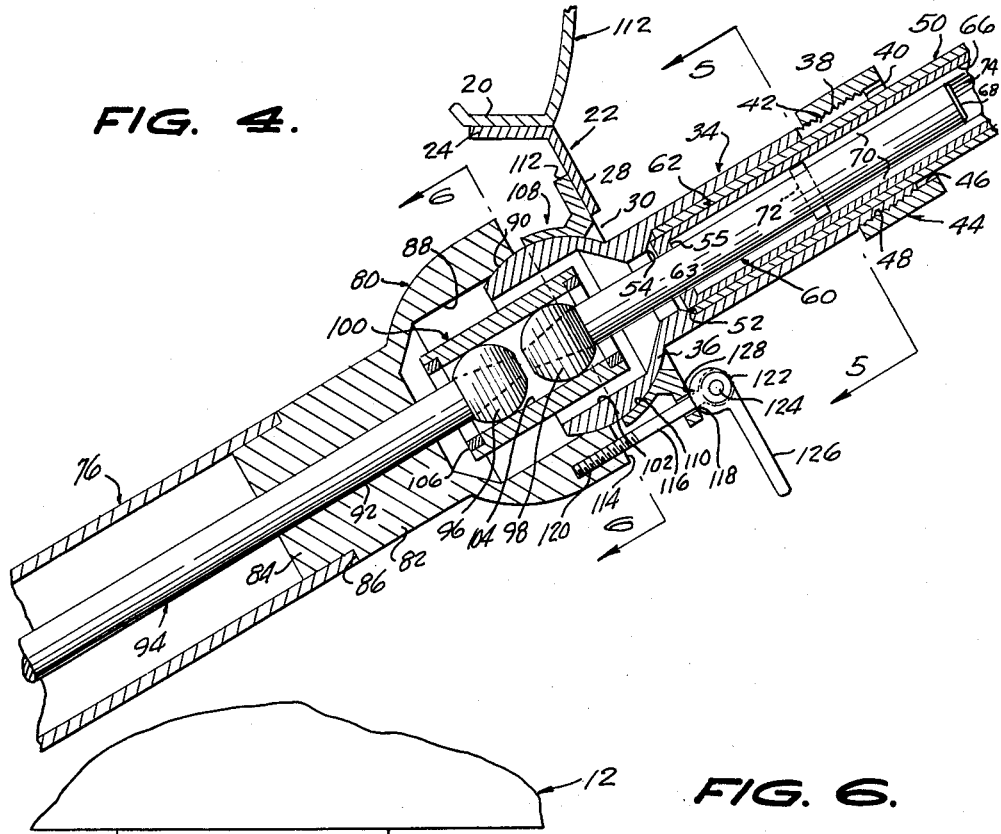
FIG. 4.
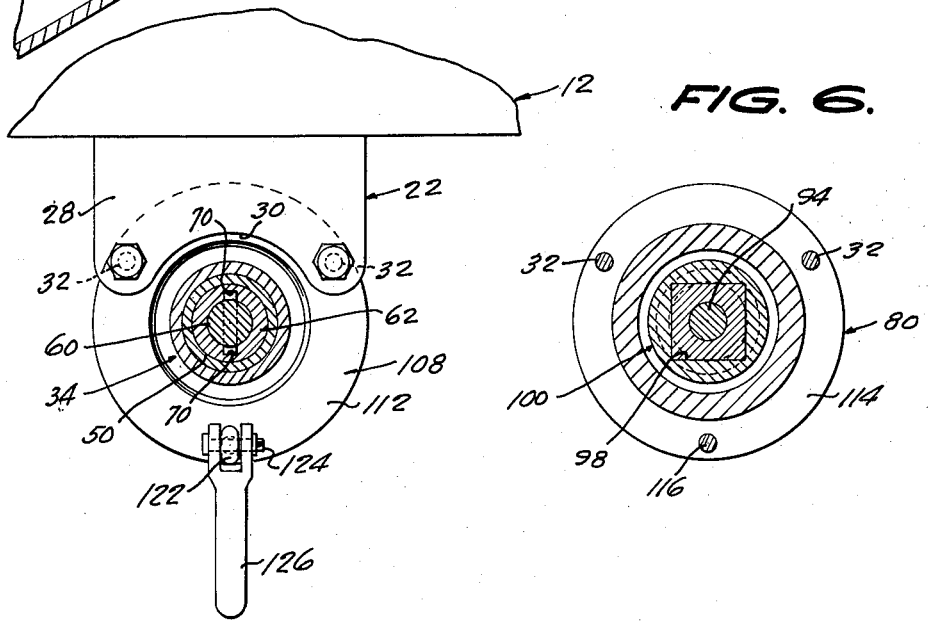
FIG. 6.
FIG. 5.
INVENTORS
GEORGE STEINER,
JOSEPH H. DeMAIRE,
BY
McMorrow, Berman + Davidson
ATTORNEYS.

United States Patent Office 3,144,785
Patented Aug. 18, 1964

3,144,785
ADJUSTABLE STEERING COLUMN
George Steiner, 58531 Main Blvd., Box 234, and Joseph H. De Maire, 30939 Prospect, both of New Haven, Mich.
Filed Sept. 21, 1962, Ser. No. 225,183
8 Claims. (Cl. 74—493)

This invention relates to a novel adjustable steering column for the steering wheels of automobiles, boats, and other machines.

The primary object of the invention is the provision of a more practical and efficient device of the kind indicated, which provides for adjustments of a steering wheel, axially toward and away from the support for the steering column, such as an automobile instrument panel, and angularly relative to the support, the adjustment being readily and quickly produced, without special skill or tools, the axial adjustment being obtainable simply by loosening a tubular clamping nut and extending or contracting a part of the upper section of the steering column and retightening the nut, and angular adjustments being obtainable simply by releasing a universal joint assembly clamping cap and angling the upper steering column and retightening the cap.

Another object of the invention is the provision of a mechanically superior device of the character indicated above, whose components are comparatively few in number, noncomplex in form, and capable of easy and quick assembly, and wherein all of the moving components are enclosed against the intrusion of dust, dirt, and weathering, and require little or no maintenance lubrication.

Other important objects and advantageous features of the invention will be apparent from the following description and the accompanying drawings, wherein, for purposes of illustration only, a specific form of the invention is set forth in detail.

Figure 1:
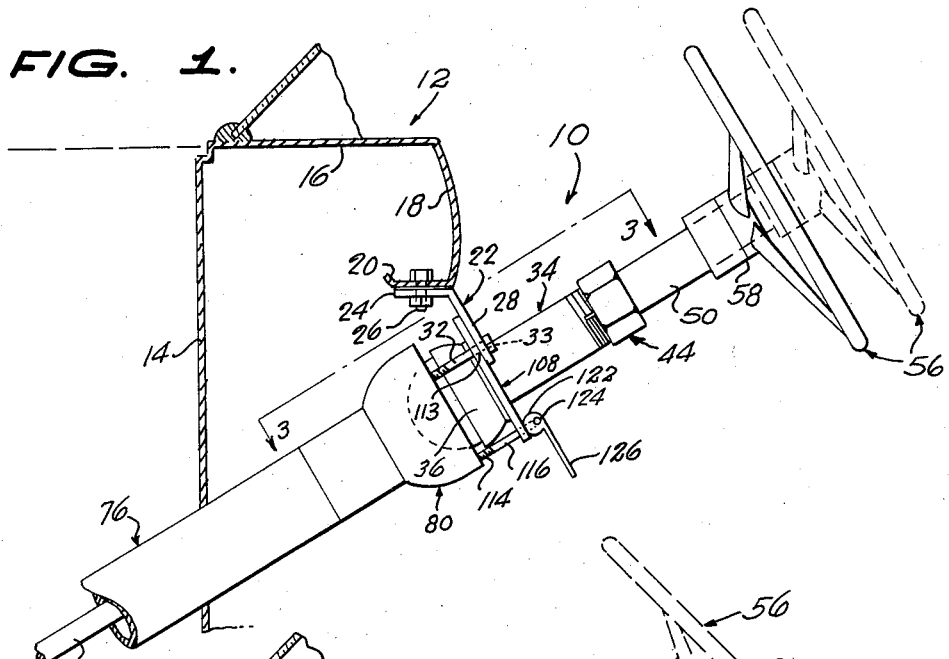
FIGURE 1 is a fragmentary side elevation of a device of the present invention, associated with an automobile instrument panel, in vertical section, an extended axial adjustment being shown in phantom lines.
Figure 2:
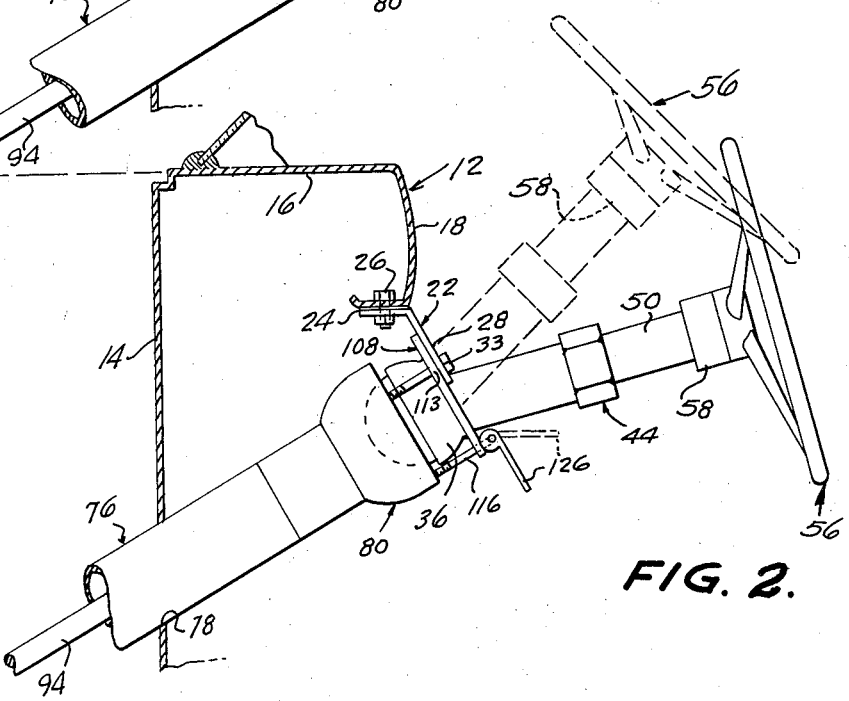
FIGURE 2 is a view like FIGURE 1, showing the device angularly adjusted to two different positions, shown, respectively, in full and in phantom lines.
Figure 3:
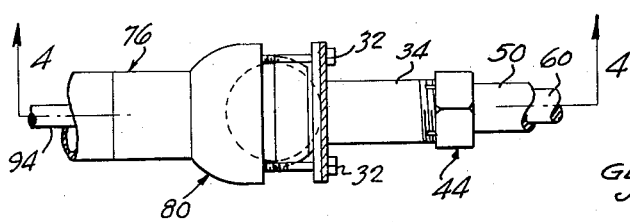
FIGURE 3 is a fragmentary horizontal section taken on the line 3—3 of FIGURE 1.

FIGURE 4 is an enlarged fragmentary vertical longitudinal section taken on the line 4—4 of FIGURE 3, the upper section of the steering column being axially aligned with the lower section thereof; and FIGURES 5 and 6 are further enlarged transverse sections taken on the lines 5—5 and 6—6, respectively, of FIGURE 4.

Referring in detail to the drawings, wherein like numerals designate like parts throughout the several views, the illustrated device, generally designated 10, is shown mounted to an automobile instrument panel 12, the device 10 being operatively connected to a steering gear (not shown).

The particular instrument panel 12 shown is supported at the upper end of a vertical firewall 14, and comprises a rearwardly extending horizontal top wall 16, which terminates in a pendant rear wall 18, having, along its lower edge, a forwardly extending horizontal flange 20, which is spaced rearwardly from the firewall 14.

A mounting bracket 22, for the device 10, has a forward horizontal portion 24, which is bolted, as indicated at 26, to the underside of the instrument panel flange 20, and an inwardly declining portion 28, provided with a transverse arcuate clearance notch 30, in its lower edge.

Bolts 32 extend freely through openings 33, provided in the lower rear corners of the bracket portion 30, are normal thereto, and extend forwardly and downwardly therefrom.

The device 10 comprises an upper tubular steering wheel column section 34, which is relatively short, and has a hollow hemispherical ball joint 36, on its lower end, which is substantially larger in diameter than the section 34. The upper part of the section 34 is provided with external screw threads 38 which extend to the upper end 40 thereof, and is formed with a longitudinal slot 42 which opens to its upper end 40. The said upper part is upwardly tapered and has threaded thereon a tubular clamping nut 44, whose bore 46 is oppositely tapered and provided with internal screw threads 48. With this arrangement, threading of the nut 44 forwardly on the section 34, compresses the upper portion thereof for the clamping in the upper section of an outer steering column sleeve 50 which is slidably telescoped therein and has a lower end 52 which is adjacent to and can engage an internal shoulder 54, at the lower end of the section 34.

The steering column sleeve 50 is substantially longer than the section 34 and extends upwardly and rearwardly thereon. A steering wheel 56 has a hub 58 which is circumposed on and is suitably journalled on the upper end of the sleeve 50. An upper steering shaft section 60, substantially smaller in diameter and shorter than the sleeve 50, is concentric thereof.

An inner spline sleeve 62 is telescoped into and extends substantially the length of the outer sleeve 50, and has a lower or forward end 63 which can abut the shoulder 54. An internal stop flange 65 is provided at the lower end of the spline sleeve 62. The bore 66 of the inner sleeve 62 closely receives the upper steering shaft section 60, which terminates, at its upper end, as indicated at 68, within the inner sleeve 62. The bore of the inner sleeve 62 is formed with a pair of diametrically opposed, longitudinal keyways 70, in which the ends of a diametrical key 72 are slidably confined, the key 72 extending through an intermediate part of the shaft section 60. The inner sleeve is nonrotatably connected in suitable manner, to the steering wheel 56. With this arrangement, the clamping nut 44 being backed off, the outer or steering column sleeve 50, and hence, the steering wheel 56, can be moved endwise, relative to the inner sleeve 62, and the upper steering column section 34, for axially adjusting the same toward or away from the driver of the automobile, after which the nut 44 is tightened to hold the adjustment.

The device 10 further comprises a lower tubular steering column section 76, preferably substantially larger in diameter than the upper column section 34, which extends at a downward and forward angle to the instrument panel 12 and supportably through an opening 78, provided therefor in the firewall. An enlarged diameter hollow ball joint socket 80 has a diametrical shank 82 which has a reduced diameter stub 84, on its forward end, which fits removably and non-rotatably in the upper end of the lower section 76, with the resultant shoulder 86 bearing against the upper end of this section. The socket 80 has an axial bore 88 which is smaller in diameter than the ball joint 36, the bore 88 having a flared and concaved annular portion 90, at its rear or upper end, in which the outer surface of the ball joint 36 conformably seats. The shank 82 has an axial bore 92 through which passes a rotatable lower steering shaft section 94, which is operatively connected, at its lower end, to an associated steering gear (not shown).

The upper end of the lower steering shaft section 94 has a fixed rectangular cross section circular disc 96, fixed on its upper end, within the bore 88 of the socket 80, which is coplanar with a similar disc 98, fixed on the lower end of the upper steering shaft section 60, the discs 96 and 98 being only slightly longitudinally spaced from each other, and operatively enclosed in a longitudinal tubular housing 100. The housing 100 is smaller in external diameter than the bore 102 of the ball joint 36 and is concentrically spaced therefrom.

The bore 104 of the housing 100 is rectangular, as shown in FIGURE 6, and conformably receives the discs 96 and 98 to form a double knee joint. The housing 100 has retaining rings 106, inset into its forward and rear ends.

An annular bearing ring 108 has a concave annular inner surface 110 which conformably and rotatably receives the upper part of the ball joint 36, and is provided, at its upper or rear end, with a lateral annular flange 112. The upper part of the flange 112 bears against the underside of the portion 28 of the mounting bracket 22, and is releasably secured thereto by means of the bolts 32 which pass freely through openings 113 provided in the flange 112, which are threaded into the flat upper end 114 of the socket 80.

A clamping screw 116 passes freely through an opening 118, provided in the lower part of the lateral flange 112 of the bearing ring 108, in a vertical plane passing through the longitudinal axis of the upper steering shaft section 34, and is threaded, at its forward or lower end, as indicated at 120, into the upper end of the socket 80. An eccentric cam 122 is transversely journaled on the upper end of the screw 116, as indicated at 124, which bears upon the upper or rear surface of the bearing ring flange 112, and has a lateral operating handle 126. When the handle 126 is swung downwardly relative to the bearing ring 108, with the bolts 32 somewhat loosened, to permit the bearing ring 108 to angle relative to the bracket 22, the nose 128 of the cam 122 is forced against the bearing ring flange 112, so that the ball joint 36 is forced upwardly against the bearing ring and clamped thereto, so that any angular adjustment of the upper steering column section 34, relative to the lower steering column section 76, and the instrument panel 12, made with the cam 122, in a retracted position and the bolts 32 loosened, is securely maintained, the bolts 32 being then retightened.

It will be understood from the foregoing that a lengthwise axial adjustment of the steering column sleeve 50 is produced easily and quickly, simply by loosening the clamping nut 44 and moving the steering wheel 56 toward or away from the instrument panel 12, and retightening this nut.

Any angular adjustment of the steering wheel 56, relative to the instrument panel 12 is easily and quickly done, simply by loosening the bolts 32, retracting the cam 122, tilting the steering wheel to the desired vertical or lateral angle, and then clamping the adjustment by means of the cam and retightening the bolts 32. It will be understood that such adjustments can be made through a range of 360°, around the axis of the lower steering column section of the device.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. An adjustable steering column comprising a relatively stationary tubular lower section and having a ball socket on its upper end, an upper tubular section extending upwardly from and in substantially axial alignment with the lower section, said upper section having a ball on its lower end engaged in said socket, a bearing ring having an annular concave inner surface engaged with the top of said ball, first clamping means acting between said bearing ring and said socket for clamping the ball in the socket, a steering shaft comprising a lower section journaled through said lower column section and an upper shaft section journaled through the upper column section, double knee joint means rotatably connecting the shaft sections together at their adjacent ends, and means for releasably and supportably connecting said bearing ring to a support.

2. An adjustable steering column comprising a relatively stationary tubular lower section and having a ball socket on its upper end, an upper tubular section extending upwardly from and in substantially axial alignment with the lower section, said upper section having a ball on its lower end engaged in said socket, a bearing ring, said bearing ring having an annular concave inner surface engaged with the top of said ball, first clamping means acting between said bearing ring and said socket for clamping the ball in the socket, a steering shaft comprising a lower section journaled through said lower column section and an upper shaft section journaled through the upper column section, double knee joint means rotatably connecting the shaft sections together at their adjacent ends, said first clamping means comprising a screw threaded into the upper end of the socket and sliding through the bearing ring, an eccentric cam journaled on the upper end of the screw and having a nose adapted to engage the upper surface of the bearing ring and clamp the ball joint in the bearing ring with said connecting means released, and an operating handle on the cam.

3. An adjustable steering column comprising a relatively stationary tubular lower section and having a ball socket on its upper end, an upper tubular section extending upwardly from and in substantially axial alignment with the lower section, said upper section having a ball on its lower end engaged in said socket, a bearing ring, said bearing ring having an annualr concave inner surface engaged with the top of said ball, first clamping means acting between said bearing ring and said socket for clamping the ball in the socket, a steering shaft comprising a lower section journaled through said lower column section and an upper shaft section journaled through the upper column section, double knee joint means rotatably connecting the shaft sections together at their adjacent ends, means for releasably and supportably connecting the bearing ring to a support and connected to the socket, said double knee joint means comprising rectangular cross section circular discs fixed on the adjacent ends of the steering shaft sections and in longitudinally spaced relationship, and a tubular housing having a longitudinal bore of rectangular cross section in which the discs are slidably and rotatably confined.

4. An adjustable steering column comprising a relatively stationary tubular lower section and having a ball socket on its upper end, an upper tubular section extending upwardly from and in substantially axial alignment with the lower section, said upper section having a ball on its lower end engaged in said socket, a bearing ring, said bearing ring having an annular concave inner surface engaged with the top of said ball, first clamping means acting between said bearing ring ad said socket for clamping the ball in the bearing ring and said socket for clamping the ball in the socket, a steering shaft comprising a lower section journaled through the upper column section, double knee joint means rotatably connecting the shaft sections together at their adjacent ends, means for releasably and supportably connecting the bearing ring to a support and connected to the socket, said double knee joint means comprising rectangular cross section circular discs fixed on the adjacent ends of the steering shaft sections and in longitudinally spaced relationship, and a tubular housing having a longitudinal bore of rectangular cross section in which the discs are slidably and rotatably confined, said socket and said ball joint having axial bores larger in diameter than and spacedly receiving related ends of said housing.

5. An adjustable steering column comprising a relatively stationary tubular lower section and having a ball socket on its upper end, an upper tubular section extending upwardly from and in substantially axial alignment with the lower section, said upper section having a ball on its lower end engaged in said socket, a bearing ring, said bearing ring having an annular concave inner surface engaged with the top of said ball, first clamping means acting between said bearing ring and said socket for clamping the ball in the socket, a steering shaft comprising a lower section journaled through said lower column section and an upper shaft section journaled through the upper column section, double knee joint means rotatably connecting the shaft sections together at their adjacent ends, means for releasably and supportably connecting the bearing ring to a support and connected to the socket, an outer sleeve slidably telescoped into said upper steering column section and extending thereabove, means non-rotatably connecting the steering wheel to the upper shaft section, an inner spline sleeve rotatably telescoped in said outer sleeve, a steering wheel being fixed to the spline sleeve, spline means connecting the upper shaft section to the inner sleeve against rotation relative thereto, and second clamping means for clamping the upper column section and the sleeves together for maintaining an endwise adjustment of the outer sleeve and the steering wheel relative to the lower steering column section.

6. An adjustable steering column comprising a relatively stationary tubular lower section and having a ball socket on its upper end, an upper tubular section extending upwardly from and in substantially axial alignment with the lower section, said upper section having a ball on its lower end engaged in said socket, a bearing ring, said bearing ring having an annular concave inner surface engaged with the top of said ball, first clamping means acting between said bearing ring and said socket for clamping the ball in the socket, a steering shaft comprising a lower section journaled through said lower column section and an upper shaft section journaled through the upper column section, double knee joint means rotatably connecting the shaft sections together at their adjacent ends, means for releasably and supportably connecting the bearing ring to a support and connected to the socket, an outer sleeve slidably telescoped into said upper steering column section and extending thereabove, an inner spline sleeve rotatably telescoped in said outer sleeve, a steering wheel fixed to the spline sleeve, spline means connecting the upper shaft section to the inner sleeve against rotation relative thereto, and second clamping means for clamping the upper column section and the sleeves together for maintaining an endwise adjustment of the outer sleeve and the steering wheel relative to the lower steering column section, said second clamping means comprising longitudinal slot means formed in and extending to the upper end of the upper column section, external screw threads on the upper end of the upper column section, said screw threads being upwardly tapered, and a tubular clamping nut having oppositely tapered internal screw threads threaded on the column section screw threads.

7. In combination, a support, a lower tubular steering column section mounted on said support and having a ball joint socket on its upper end, an upper tubular steering column section extending upwardly from and in substantially axial alignment with the lower section, said upper section having a ball joint on its lower end engaged in said socket, a bearing ring, said bearing ring having an annular concave inner surface engaged with the top of said ball joint, first clamping means acting between said bearing ring and said socket for clamping the ball joint in the socket, a steering shaft comprising a lower section journaled through said lower column section and an upper shaft section journaled through the upper column section, double knee joint means rotatably connecting the shaft sections together at their adjacent ends, a bracket fixed to said part of the support, said support having a part above the bearing ring and having a portion engaged by an upper part of the bearing ring, and means releasably and supportably connecting the bearing ring to the support and connected to the socket.

8. In combination, a support, a lower tubular steering column section mounted on said support and having a ball joint socket on its upper end, an upper tubular steering column section extending upwardly from and in substantially axial alignment with the lower section, said upper section having a ball joint on its lower end engaged in said socket, a bearing ring, said bearing ring having an annular concave inner surface engaged with the top of said ball joint, first clamping means acting between said bearing ring and said socket for clamping the ball joint in the socket, a steering shaft comprising a lower section journaled through said lower column section and an upper shaft section journaled through the upper column section, double knee joint means rotatably connecting the shaft sections together at their adjacent ends, a bracket fixed to said part of the support, said support having a part above the bearing ring and having a portion engaged by an upper part of the bearing ring, means releasably and supportably connecting the bearing ring to the support and connected to the socket, said connecting means comprising bolts extending freely and downwardly through said portion of the bracket and freely through the bearing ring and threaded into the upper end of the socket.

References Cited in the file of this patent
UNITED STATES PATENTS

| | | |
|---|---|---|
| 1,025,215 | Stull | May 7, 1912 |
| 1,367,695 | Gray | Feb. 8, 1921 |
| 1,655,138 | De Orlo | Jan. 3, 1928 |
| 2,079,536 | Thurber | May 4, 1937 |
| 2,185,779 | Tviedt | Jan. 2, 1940 |
| 2,464,856 | Finley | Mar. 22, 1949 |
| 2,830,464 | Winterbauer | Apr. 15, 1958 |
| 2,910,887 | Helins | Nov. 3, 1959 |